United States Patent

Kimura et al.

[11] Patent Number: 5,906,258
[45] Date of Patent: May 25, 1999

[54] PRESSURE PLATE PREFORMED WITH PROTRUSIONS AND METHOD FOR BALANCING THE PRESSURE PLATE BY REMOVING PORTIONS OF THE PROTRUSIONS

[75] Inventors: Hiroshi Kimura, Neyagawa; Yasushi Takehira, Kobe; Shinichi Noda, Neyagawa, all of Japan

[73] Assignee: Exedy Corporation, Neyagawa, Japan

[21] Appl. No.: 08/841,369

[22] Filed: Apr. 30, 1997

[30] Foreign Application Priority Data

May 14, 1996 [JP] Japan .................................. 8-118802

[51] Int. Cl.6 ................................................ F16D 13/58
[52] U.S. Cl. .................................. 192/107 R; 192/110 R
[58] Field of Search ............................ 192/110 R, 107 R; 29/901, 527.6

[56] References Cited

U.S. PATENT DOCUMENTS

| 3,090,475 | 5/1963 | Gatewood et al. | 192/99 A |
|---|---|---|---|
| 4,591,041 | 5/1986 | Valier | 192/107 R |
| 4,597,486 | 7/1986 | Kabayama | 192/70.14 X |
| 4,611,702 | 9/1986 | Kayakabe et al. | 192/110 R |
| 4,778,040 | 10/1988 | Kabayama | 192/110 R |
| 5,413,202 | 5/1995 | Maucher | 192/107 R X |
| 5,655,641 | 8/1997 | Ament et al. | 192/212 |

FOREIGN PATENT DOCUMENTS

| 3418315 | 11/1985 | Germany | 192/110 R |
|---|---|---|---|
| 3434304 | 3/1986 | Germany | 192/110 R |
| 3434306 | 3/1986 | Germany | 192/110 R |
| 3608737 | 9/1987 | Germany | 192/110 R |
| 2217798 | 11/1989 | United Kingdom | 192/110 R |
| 2250069 | 5/1992 | United Kingdom | 192/110 R |

*Primary Examiner*—Charles A. Marmor
*Assistant Examiner*—Saúl Rodríguez
*Attorney, Agent, or Firm*—Shinjyu An Intellectual Property Firm

[57] ABSTRACT

The present invention relates to a pressure plate 12 that is formed with a plurality of protrusions 12a. The amount of the imbalance in the pressure plate 12 is measured, the imbalance is then corrected by machining the protrusions 12a in accordance with the amount of determined imbalance.

17 Claims, 4 Drawing Sheets

PRESSURE PLATE PREFORMED WITH PROTRUSIONS AND METHOD FOR BALANCING THE PRESSURE PLATE BY REMOVING PORTIONS OF THE PROTRUSIONS

BACKGROUND OF THE INVENTION

1. Field of the Invention

The present invention relates to a pressure plate of a clutch cover assembly and a method for correcting rotational imbalances present in the clutch cover assembly by removing preformed portions of the pressure plate.

2. Description of the Related Art

A clutch cover assembly is used for selectively engaging and disengaging a clutch disc from contact with a flywheel. The clutch cover assembly includes a clutch cover fixed to the flywheel, a pressure plate disposed within the clutch cover and a biasing means for urging the pressure plate into contact with the flywheel. The biasing means could be, for instance, a series of coil springs or a diaphragm spring. The pressure plate is configured to engage the clutch disc and urge the clutch disc into contact with the flywheel. The biasing means are configured to bias the pressure plate toward the flywheel.

The clutch assembly incorporating the clutch cover assembly described above rotates together with the flywheel. Due to the rotation of the flywheel and clutch cover assembly, it is important for the flywheel and clutch cover assembly to be balanced to prevent undesirable vibrations. Typically, the pressure plate is formed by cast molding and therefore, is relatively dense and requires balancing. Therefore, the pressure plate is often balanced separately from the clutch cover assembly.

The conventional method for correcting imbalances in the pressure plate includes forming a hole or holes somewhere on a surface of the pressure plate, often on a surface opposite a friction surface which engages the clutch disc.

As described above, since the pressure plate rotates together with the flywheel at a high speed, when the pressure plate is provided with the mechanical working process such as forming a hole/piercing, the mechanical strength of the processed portion thereof is degraded. Therefore, the extent of the correction of an imbalance in the pressure plate is limited due to potential degradation of the mechanical strength of the pressure plate. As a result, often final correction of imbalances in the pressure plate are effected not on the pressure plate itself but instead on the clutch cover assembly. Such corrections of imbalances of the pressure plate on the clutch cover assembly are not desirable since the pressure plate still includes some imbalance.

SUMMARY OF THE INVENTION

An object of the present invention is to reduce the imbalance in a pressure plate while the mechanical strength of the pressure plate is maintained and more of the correction for imbalance is carried out in the pressure plate.

In accordance with one aspect of the present invention, a pressure plate includes a first surface and a second surface, the first surface configured for engagement with friction portions of a clutch disc, the second surface formed with a plurality of protrusions configured to be machined in response to imbalances identified in the pressure plate.

Preferably, the second surface is opposite the first surface.

Preferably, the plurality of protrusions include a first group of protrusions formed at a first radial distance from the center of the pressure plate and a second group of protrusions formed at a second radial distance from the center of the pressure plate.

Preferably, the protrusions extend in a generally axial direction.

Preferably, each of the protrusions is formed with a recess shaped to conform to the end of a drill.

In accordance with another aspect of the present invention, a method for correcting imbalance in a pressure plate of a clutch cover assembly includes the steps of:

forming a pressure plate with a plurality of protrusions extending from a surface thereof;

determining an imbalance in the pressure plate; and machining the protrusions to reduce their size and mass to correct imbalance.

Preferably, the method also includes the step of forming holes in the pressure plate to correct for further imbalances.

In accordance with the present invention, a plurality of protrusions are provided on the pressure plate when the pressure plate is manufactured by, for example, cast molding. These protrusions are intended for correcting the imbalance and are not related to the mechanical strength of the pressure plate. In correcting the imbalance, first, it is determined if an imbalance is present in the pressure plate, and the correction of the imbalance is then carried out in accordance with the determination made by use of a measuring apparatus. Correcting the imbalance is carried out by machining the protrusions.

Since the protrusions are not related to the mechanical strength of the pressure plate, machining the protrusion does not lower the mechanical strength of the pressure plate and it is possible to correct the imbalance by reducing the weight of selected protrusions.

In the event that removal of portions of the protrusions is not sufficient to balance the pressure plate, the amount of the imbalance in the pressure plate is further reduced by forming a hole or holes in the pressure plate within an allowable range determined by requirements of the mechanical strength of the pressure plate. In other words, the protrusions broaden the range of correcting the imbalance in the pressure plate while maintaining the mechanical strength of the plate.

The recess formed in each protrusion allows the tip end of a drill to be readily inserted into the protrusion when machining the protrusion for correcting the imbalance in the pressure plate.

These and other objects, features, aspects and advantages of the present invention will become more fully apparent from the following detailed description of the present invention when taken in conjunction with the accompanying drawings where like reference numerals denote corresponding parts throughout, in which:

DESCRIPTION OF THE PREFERRED EMBODIMENTS

Figure 1:
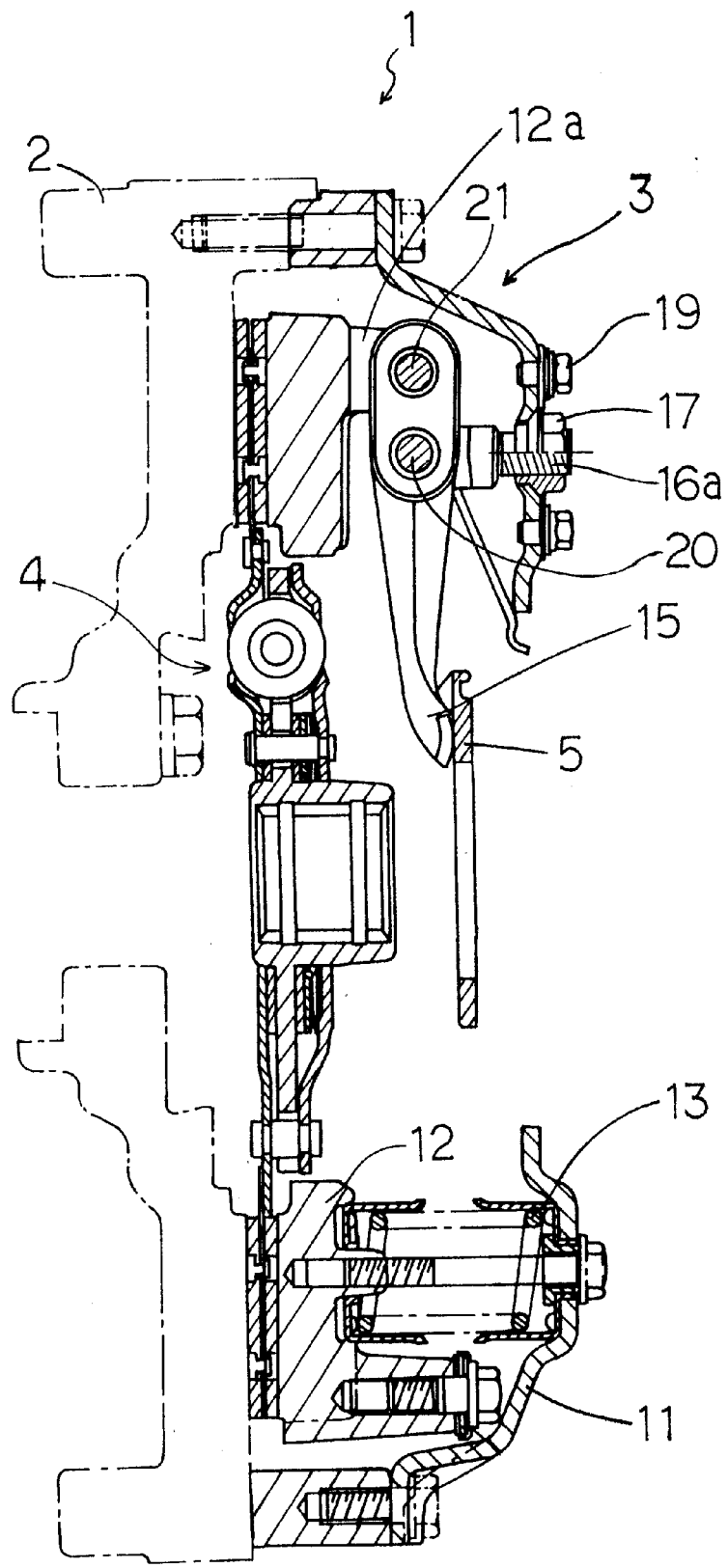
FIG. 1 is a fragmentary, side sectional view of a clutch cover assembly in accordance with one embodiment of the present invention.

A clutch assembly 1 in accordance with one embodiment of the present invention is shown in FIG. 1. For reference, the left side of FIG. 1 will hereinafter be referred to as the engine side and the right side of FIG. 1 will be referred to as the transmission side. The clutch assembly 1 is used to selectively transmit torque from a flywheel 2 on the engine side to a transmission input shaft (not shown) on the transmission side. The clutch assembly 1 includes the flywheel 2, a clutch cover assembly 3 and a clutch disc assembly 4.

Figure 2:
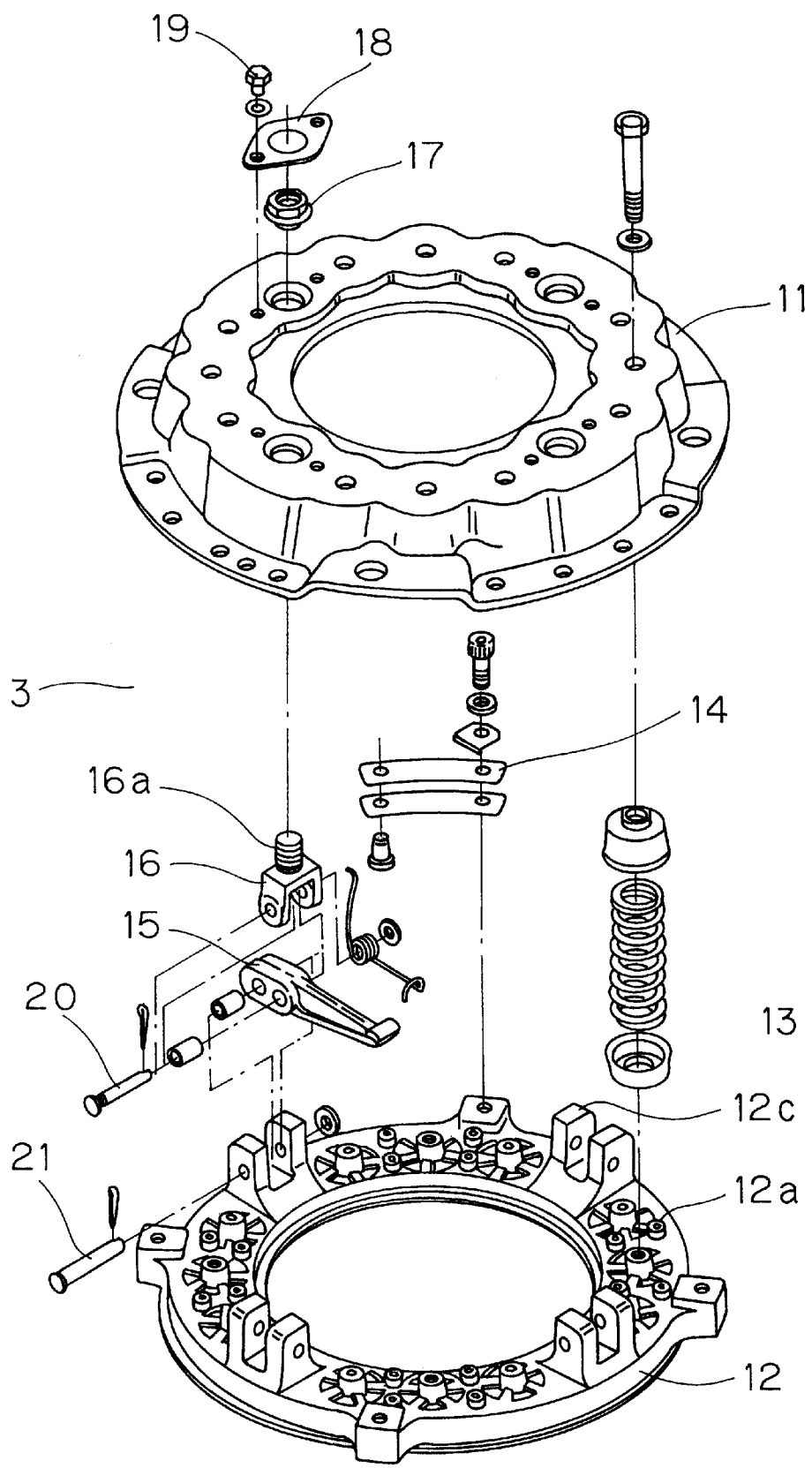
FIG. 2 is an oblique, exploded view of the clutch cover assembly depicted in FIG. 1.

As shown in FIGS. 1 and 2, the clutch cover assembly 3 includes a clutch cover 11 having a dish-like shape and which is fixed to the flywheel 2. The clutch cover assembly 3 also includes a pressure plate 12 fixed to the clutch cover 11 so as not to rotate relative thereto. The pressure plate 12 is configured to be movable in axial directions relative to the clutch cover 11 via strap plates 14. The clutch cover assembly 3 also includes a plurality of coil springs 13 for biasing the pressure plate 12 toward the flywheel 2 and a plurality of levers 15 which are supported by the clutch cover 11 and are intended for selectively disengaging the pressure plate 12 from engagement with the clutch disc assembly 4.

The pressure plate 12 includes a friction surface which is configured to contact the frictional element portion of the clutch disc assembly 4. Opposite the friction surface on a reverse surface on the transmission side of the pressure plate 12 there is formed a plurality of projecting portions 12c. Each of the projecting portions 12c serve to support a pin 21 which extends through holes formed in each projection portion 12c. Each pin in turn further extends through a hole formed a corresponding lever 15 such that the lever 15 is pivotally supported on its own corresponding pin 21. The coil spring 13 is disposed between the clutch cover 11 and the pressure plate 12, and applies a predetermined amount of pressure or force on the pressure plate 12. The distal end portion (the inner circumferential portion) of the lever 15 is configured to contact a release element 5 which is depicted in FIG. 1. When external force in applied to the release element 5 causing it to contact the levers 15, the pressure plate 12 is pulled toward the clutch cover 11 via movement of the levers 15.

Each lever 15 is retained in the clutch cover 11 by means of a lever retaining assembly. Each lever retaining assembly includes a lever support 16, a support nut 17 and a lock plate 18. The lever support 16 is pivotally coupled to the lever 15 by a pin 20. The lever support 16 further includes at its distal end portion a male screw portion 16a which extends through a hole formed in the clutch cover 11 and is screwed together with the support nut 17.

Figure 3:
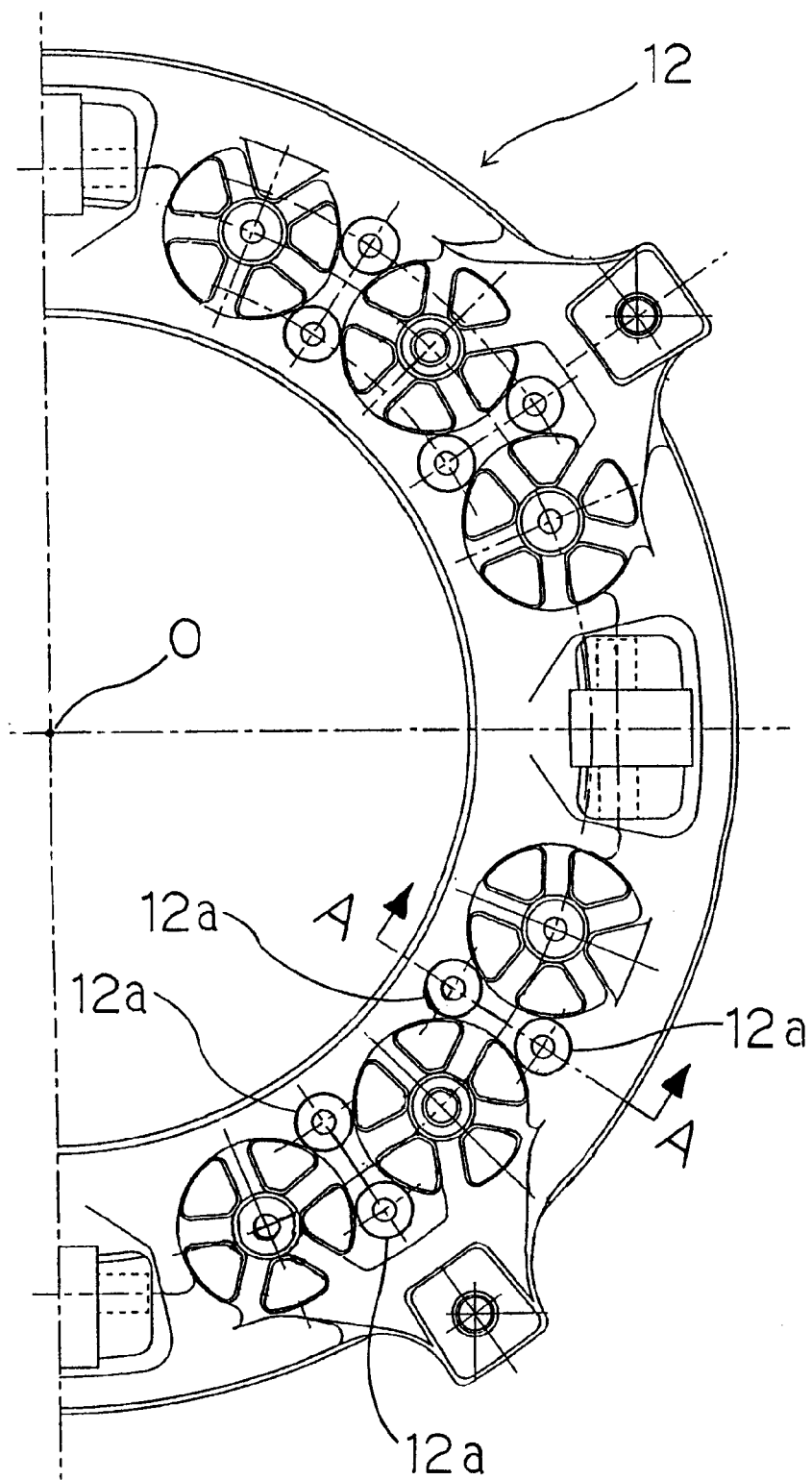
FIG. 3 is a plane view of a pressure plate.
Figure 4:
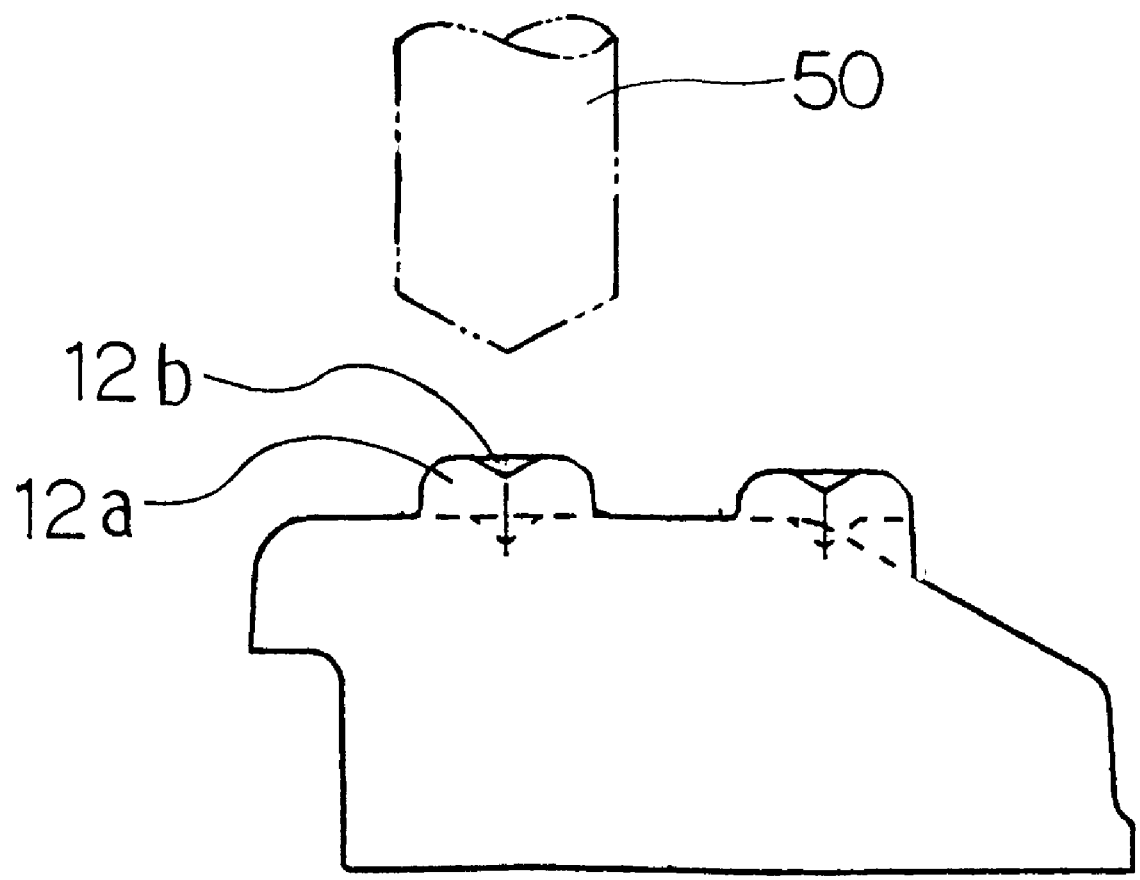
FIG. 4 is a sectional view of the pressure plate taken along the line A—A in FIG. 3.

The pressure plate 12 of the present invention, as shown in FIGS. 1–4, includes a plurality of column-like protrusions 12a which serve to assist in balancing the pressure plate 12 for rotational movement about its center 0. The distal end of each protrusion 12a is formed with a recess 12b into which the tip end of a drill can be inserted. Each of the protrusions 12a is formed on the surface of the pressure plate 12 remote from the clutch disc assembly 4. The protrusions 12a are formed at two different radial distances from the center 0 of the pressure plate 12, as is shown in FIG. 3. The protrusions 12a are pre-formed during the cast molding process which produces the pressure plate 12 and therefore are integral with the remainder of the pressure plate 12.

The method for balancing in the pressure plate 12 will now be described.

First, the pressure plate 12 having the protrusions 12a is installed in a measuring instrument or apparatus such as a balancing device to determine if an imbalance is present. The position of the protrusion 12a or protrusions 12a closest to the point or points of imbalance are determined. Next, identified protrusions 12a may be reduced by machining the protrusion 12a using a drill 50. The identified protrusion 12a may be reduced in accordance with the degree of imbalance determined by use of the balancing device. At this time, the tip end of the drill 50 is readily inserted into the recess 12b of the identified protrusion 12a, the drill 50 is rotated to remove portions of the protrusion 12a.

If the amount of material removed from the protrusion 12a or protrusions 12a is not sufficient to balance the pressure plate 12, it is still possible to form a hole or holes in the pressure plate 12 to balance the pressure plate 12. Since the protrusions 12a are first machined or reduced to balance the pressure plate 12, forming a hole in the pressure plate 12 for further balancing is less likely to degrade the mechanical strength of the pressure plate 12.

Since the protrusion 12a is not related to the mechanical strength of the pressure plate 12, machining the protrusion 12a does not lower the mechanical strength of the pressure plate 12. Further, the range of correcting the imbalance in the present invention becomes broader due to the additional mass or weight provided by the protrusion 12a. In other words, the present invention provides a pressure plate with a broader range for correction of imbalance while maintaining the mechanical strength of the pressure plate 12 when compared to prior art pressure plates.

ADVANTAGES OF THE INVENTION

The present invention can effect a broader range of imbalance correction in a pressure plate by the weight of protrusions formed on it without degrading the mechanical strength thereof compared with the conventional method.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A pressure plate comprising:
   a pressure plate having a first surface and a second surface, said first surface configured for engagement with friction portions of a clutch disc,
   said pressure plate being formed with a plurality of pairs of first protrusions configured to be machined in response to imbalances identified in said pressure plate,
   said plurality of pairs of first protrusions extending outward from said second surface.

2. The pressure plate as in claim 1, wherein said second surface is opposite said first surface.

3. The pressure plate as in claim 2, wherein said plurality of pairs of said first protrusions include a first group of protrusions formed at a first radial distance from the center of said pressure plate and a second group of protrusions formed at a second radial distance from the center of said pressure plate.

4. The pressure plate as in claim 1, wherein said pairs of said first protrusions extend in a generally axial direction.

5. The pressure plate as in claim 1, wherein each of said pairs of said first protrusions is formed with a recess shaped to conform to the end of a drill.

6. The pressure plate as in claim 1, said pressure plate further comprising second protrusions circumferentially spaced apart from said first protrusions, said second protrusions configured for engagement with spring members which bias movement of said pressure plate.

7. The pressure plate as in claim 1, wherein each of said pair of said first protrusions are spaced apart from one another such that one protrusion of each of said pairs of said first protrusions is disposed radially inward from a second one protrusion of each of said pairs of first protrusions.

8. The pressure plate as in claim 1, wherein each pair of said pairs of said first protrusions is radially aligned with respect to a center of said pressure plate.

9. The pressure plate as in claim 1, wherein said second surface defines a plane and said pairs of said first protrusions extend outward from said plane, said pairs of said first protrusions being machinable by drilling, the drilling being confined to portions of said first protrusions.

10. A pressure plate comprising:

a pressure plate having a first surface and a second surface, said first surface configured for engagement with friction portions of a clutch disc, said pressure plate being formed with a plurality of first protrusions configured to be machined in response to imbalances identified in said pressure plate, said plurality of first protrusions extending outward from said second surface, and said pressure plate being formed with a plurality of second protrusions circumferentially spaced apart from said first protrusions, said second protrusions configured for engagement with spring members which bias movement of said pressure plate.

11. The pressure plate as in claim 10, wherein said first protrusions are formed as pairs of said first protrusions spaced apart from one another such that one protrusion of each of said pairs of said first protrusions is disposed radially inward from a second one protrusion of each of said pairs of first protrusions.

12. The pressure plate as in claim 11, wherein each pair of said pairs of said first protrusions is radially aligned with respect to a center of said pressure plate.

13. The pressure plate as in claim 11, wherein said second surface defines a plane and said pairs of said first protrusions extend outward from said plane, said pairs of said first protrusions being machinable by drilling, the drilling being confined to portions of said first protrusions.

14. The pressure plate as in claim 11, wherein said plurality of said pairs of said first protrusions include a first group of protrusions formed at a first radial distance from the center of said pressure plate and a second group of protrusions formed at a second radial distance from the center of said pressure plate.

15. The pressure plate as in claim 11, wherein said pairs of said first protrusions extend in a generally axial direction.

16. The pressure plate as in claim 11, wherein each of said pairs of said first protrusions is formed with a recess shaped to conform to the end of a drill.

17. The pressure plate as in claim 10, wherein said second surface is opposite said first surface.

* * * * *